Dec. 8, 1936.                    G. MILLER                    2,063,181
                         SELF LOCKING NUT WASHER
                       Original Filed Nov. 22, 1930

Inventor

G. Miller

By Watson E. Coleman
             Attorney

Patented Dec. 8, 1936

2,063,181

UNITED STATES PATENT OFFICE 2,063,181

SELF-LOCKING NUT WASHER

Glenmore Miller, Pontiac, Mich.

Application November 22, 1930, Serial No. 497,541
Renewed March 5, 1936

2 Claims. (Cl. 85—32)

This invention relates to nuts and bolts and particularly to a self-locking nut washer. The general object of this invention is to provide a combined nut and washer so formed that it may be applied to a screw or a bolt and so formed that as the screw or bolt is turned the nut or washer will be forced into engagement with the work and at the same time will automatically tighten upon the bolt to an extent which will hold the bolt or screw from loosening, but which will not prevent the bolt or screw from being removed upon the application of proper force thereto.

A further object is to provide a device of this kind in which the nut washer is initially curved and as the screw or bolt is turned, the nut washer will flatten and as it flattens will bind upon the screw or bolt and also bite upon the screw or bolt and also bite into the work.

My invention is illustrated in the accompanying drawing, wherein:—

Figure 1 is a sectional view through a piece of work with my nut washer applied to the bolt therein;

Figure 2 is a longitudinal sectional view through the nut washer on the line 2—2 of Figure 3;

Figure 3 is a top plan view.

Referring to this drawing. 10 designates a strip of metal having at its corners the prongs 11. This strip is initially slitted at 12 to provide two opposed tongues 13. These tongues at their ends are turned outward as at 14 and these outwardly turned portions, which are arcuate in cross section, are interiorly screw-threaded as at 15. The plate or strip 14 is initially curved and may be made resilient or of shape-retentive material. When the screw or bolt 16 is inserted through the work A, it engages the screw-threads of the outwardly turned portions 14 and then as the screw is turned, the plate or strip 10 will be gradually flattened, forcing the prongs 11 into the work and the gradual flattening of the plate will cause the screw-threaded portions 14 to be forced toward each other and to bind upon the screw or bolt. This deflection of the plate 10 brings the threads on the portions 14 absolutely square with the thread on the bolt or screw, but so tightens this nut washer upon the bolt or screw that the bolt cannot become readily disengaged, but must be positively rotated in order to unscrew it from its engagement with this nut washer.

I claim:—

1. A nut of the character described, formed of a relatively thin sheet metal plate, the middle of the plate being formed to provide two opposed longitudinally extending tongues defined by longitudinally extending slits, a cross slit between the tongues, each tongue at its inner end being extended outward in a direction away from the plate and at right angles thereto and each outwardly extending portion being transversely concave on its inner face, these concave faces being screw-threaded and the threads extending the length of each portion, the tongues being initially disposed in inclined planes relative to the plate and convergently with reference to each other, the angular extremities of the tongues being initially disposed in angular relation to each other whereby when the tongues are forced toward the plane of the plate, the screw-threaded end faces of the tongues will be forced into engagement with the work and the angular extremities of the tongues will be brought into approximately parallel relation to each other.

2. A spring nut comprising a base portion of sheet metal having spring-like characteristics, and having a pair of tongues struck upwardly from the base portion intermediate the ends thereof and in opposition to each other, the tongues terminating in spaced curved portions, each having the inner surface thereof threaded, and the threads on one part coacting with those of the other part to fit the threads of a bolt that is inserted therethrough.

GLENMORE MILLER.